United States Patent
Naruse

(10) Patent No.: US 11,378,379 B2
(45) Date of Patent: Jul. 5, 2022

(54) TOOL CUTTING EDGE MEASURING DEVICE AND MACHINE TOOL

(71) Applicant: OKUMA CORPORATION, Niwa-Gun (JP)

(72) Inventor: Shinya Naruse, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 77 days.

(21) Appl. No.: 17/018,080

(22) Filed: Sep. 11, 2020

(65) Prior Publication Data

US 2021/0088319 A1 Mar. 25, 2021

(30) Foreign Application Priority Data

Sep. 24, 2019 (JP) .............................. JP2019-173330

(51) Int. Cl.
*G01B 5/012* (2006.01)
*B23B 49/00* (2006.01)

(52) U.S. Cl.
CPC .............. *G01B 5/012* (2013.01); *B23B 49/00* (2013.01)

(58) Field of Classification Search
None
See application file for complete search history.

(56) References Cited

U.S. PATENT DOCUMENTS

| | | | |
|---|---|---|---|
| 4,136,458 A * | 1/1979 | Bell ...................... | G01B 5/012 33/561 |
| 10,307,877 B2 * | 6/2019 | Morimura ............... | B25J 11/005 |
| 10,393,505 B2 * | 8/2019 | Christoph ............ | G01B 11/007 |
| 10,688,612 B2 * | 6/2020 | Morimura ............ | B25J 15/0066 |
| 10,889,012 B2 * | 1/2021 | Morimura ............ | B25J 19/0058 |
| 2009/0133545 A1 * | 5/2009 | Tanaka ................... | B23Q 17/20 82/121 |
| 2016/0097626 A1 * | 4/2016 | Miess .................... | G01B 5/016 33/503 |
| 2019/0168380 A1 * | 6/2019 | Morimura .......... | B23Q 17/0985 |
| 2021/0039212 A1 * | 2/2021 | Morimura ............ | B25J 15/0066 |
| 2021/0229226 A1 * | 7/2021 | Morimura .......... | B23Q 17/2409 |

FOREIGN PATENT DOCUMENTS

JP 2011-031368 A1 2/2011

* cited by examiner

*Primary Examiner* — Christopher W Fulton
(74) *Attorney, Agent, or Firm* — Burr & Brown, PLLC

(57) ABSTRACT

A tool cutting edge measuring device that is mounted on a horizontal lathe and multitasking machine includes contact type sensors and an arm. The sensors are configured to measure cutting edge positions of tools in a machining chamber and the arm is movable between an advance position and a retracted position. The arm advances into the machining chamber at the advance position and retracts from the machining chamber at the retracted position. The arm has distal ends provided with two branching units branched into the X-axis direction and the Z-axis direction at the advance position and the sensors are mounted to the respective branching units.

4 Claims, 4 Drawing Sheets

TOOL CUTTING EDGE MEASURING DEVICE AND MACHINE TOOL

BACKGROUND

This application claims the benefit of Japanese Patent Application Number 2019-173330 filed on Sep. 24, 2019, the entirety of which is incorporated by reference.

TECHNICAL FIELD

The disclosure relates to a tool cutting edge measuring device provided for a machine tool, such as a horizontal lathe, used to detect a cutting edge position of a tool and set a tool correction value, and the machine tool that includes the device.

RELATED ART

A machine tool, such as a horizontal lathe and a multi-tasking machine, performs a work that measures a cutting edge position of a tool mounted to a tool post or a spindle when the tool or a tip is exchanged and compares the cutting edge position with a preliminarily obtained cutting edge position of a reference tool. In a case where both the cutting edge positions differ, a tool correction value is calculated from the difference, and a machining program is corrected based on the calculated tool correction value.

As one of the conventional tool cutting edge measuring devices, JP-A-2011-31368 discloses the following structure. In a vertical lathe, a pair of touch sensors having detection surfaces are disposed on distal ends of a pair of respective arms such that the detection surfaces are opposed. One touch sensor is used for measurement of a tool for inner diameter machining (hereinafter referred to as "inner diameter tool" in this specification), and the other touch sensor is used for measurement of a tool for outer diameter machining (hereinafter referred to as "outer diameter tool" in this specification). Each arm is individually movable between an advance position where the arm advances to a machining chamber and holds the touch sensor at a detecting position of a cutting edge and a retracted position where the touch sensor is retracted from the inside of the machining chamber.

With the tool cutting edge measuring device of JP-A-2011-31368, since the arm is taken into and out from a space between a wall of the machining chamber and a workpiece, depending on a size of the space, a long tool possibly causes the ram to interfere with the wall or the workpiece. Accordingly, the length required for the tool possibly cannot be ensured.

The problem similarly occurs in the horizontal lathe as well. FIG. 4 illustrates a tool cutting edge measuring device 20 disposed in a horizontal lathe 1. The tool cutting edge measuring device 20 includes an arm 21 configured to turn between an advance position to an inside of a machining chamber 2 and a retracted position where the arm 21 stands up along a wall 7 of the machining chamber 2. A touch sensor 22 is mounted to a distal end of the arm 21 extending in an X-axis positive direction.

When an inner diameter tool 23 disposed on a tool post 5 is measured by advancing the arm 21 in the tool cutting edge measuring device 20, a distance D between the tool post 5 and a tailstock 4 in a Z-axis direction is short. Accordingly, when the inner diameter tool 23 is long, the tool post 5 moving in the Z-axis positive direction possibly interferes with the tailstock 4, and after all, the required tool length cannot be ensured.

Therefore, an object of the disclosure is to provide a tool cutting edge measuring device and a machine tool that avoid an interference with a structure inside a machine regardless of a type of a tool, allow measurement of a cutting edge, and allow ensuring a required tool length.

SUMMARY

In order to achieve the above-described object, there is provided a tool cutting edge measuring device according to a first aspect of the disclosure. The tool cutting edge measuring device is mounted to a machine tool. The machine tool is capable of relatively positioning a tool post in a Z-axis direction as a spindle axial direction. It is also capable of relatively positioning a tool post in an X-axis direction as a moving direction for cutting a workpiece and the X-axis direction is orthogonal to the Z-axis direction. The tool cutting edge measuring device includes contact type sensors and an arm. The sensors are configured to measure cutting edge positions of tools in a machining chamber. The arm is movable between an advance position and a retracted position. The arm advances into the machining chamber at the advance position. The arm retracts from the machining chamber at the retracted position. The arm has distal ends provided with two branching units branched into the X-axis direction and the Z-axis direction at the advance position. The sensors are mounted to the respective branching units.

In a disclosure according to a second aspect of the disclosure, which is in the above-described configuration, one of the sensors is configured to measure an inner diameter machining tool of the workpiece, and another sensor is configured to measure an outer diameter machining tool of the workpiece.

In order to achieve the above-described object, there is provided a machine tool according to a third aspect of the disclosure. The machine tool is capable of relatively positioning a tool post in a Z-axis direction as a spindle axial direction. It is also capable of relatively positioning a tool post in an X-axis direction as a moving direction for cutting a workpiece and the X-axis direction is orthogonal to the Z-axis direction. The machine tool includes the tool cutting edge measuring device according to the first aspect or the second aspect.

With the embodiment, the one touch sensor can advance into the machining chamber, and even with the tool having the long protrusion, the tool can be easily brought into abutment with the sensor without the interference with the structure, such as the tailstock, and without the restriction on the stroke. Accordingly, the cutting edge can be measured while the interference with the structure inside the machine can be avoided regardless of the type of the tool, and the required tool length can be ensured.

DETAILED DESCRIPTION

Embodiments of the disclosure will be described based on the drawings.

Figure 1:
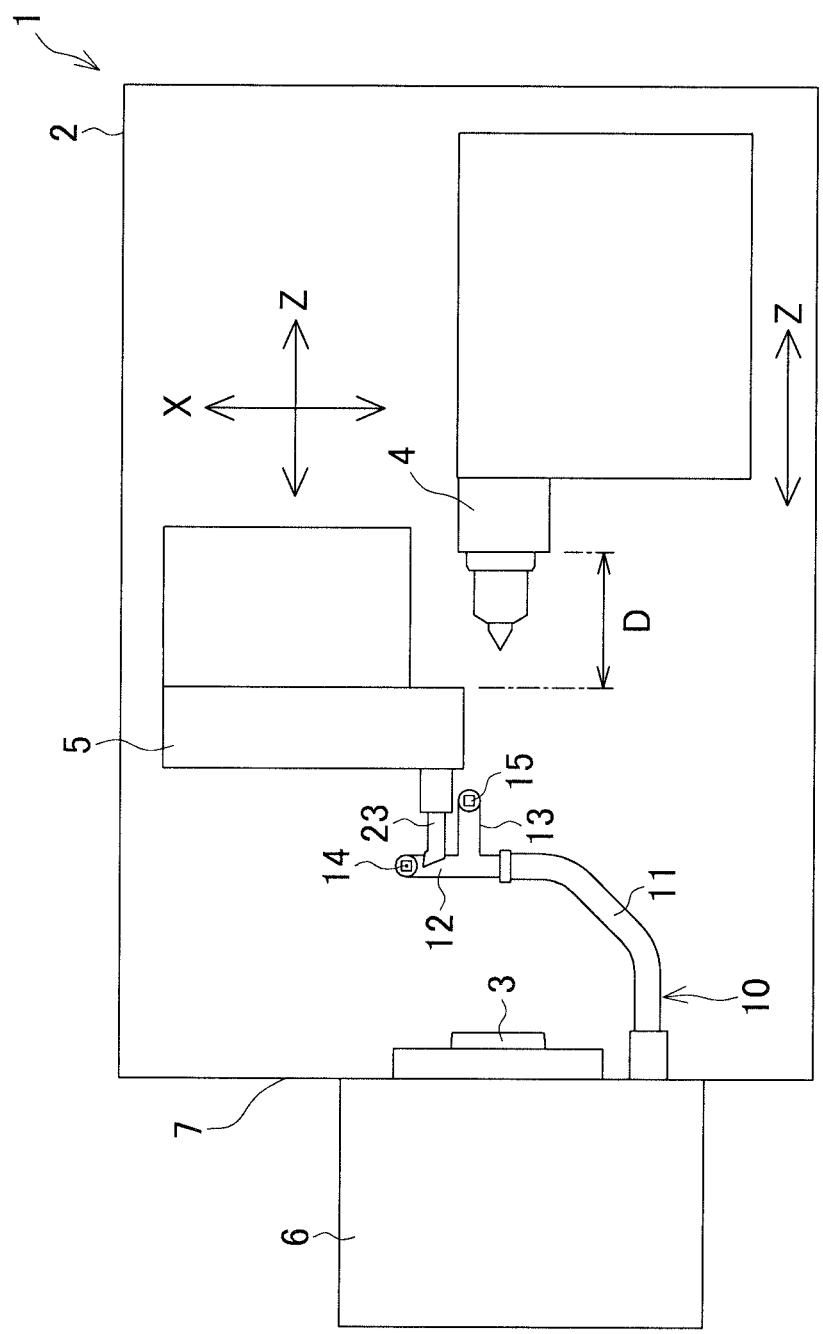
FIG. 1 is a schematic diagram of a tool cutting edge measuring device that measures an inner diameter tool and a horizontal lathe.
Figure 4:
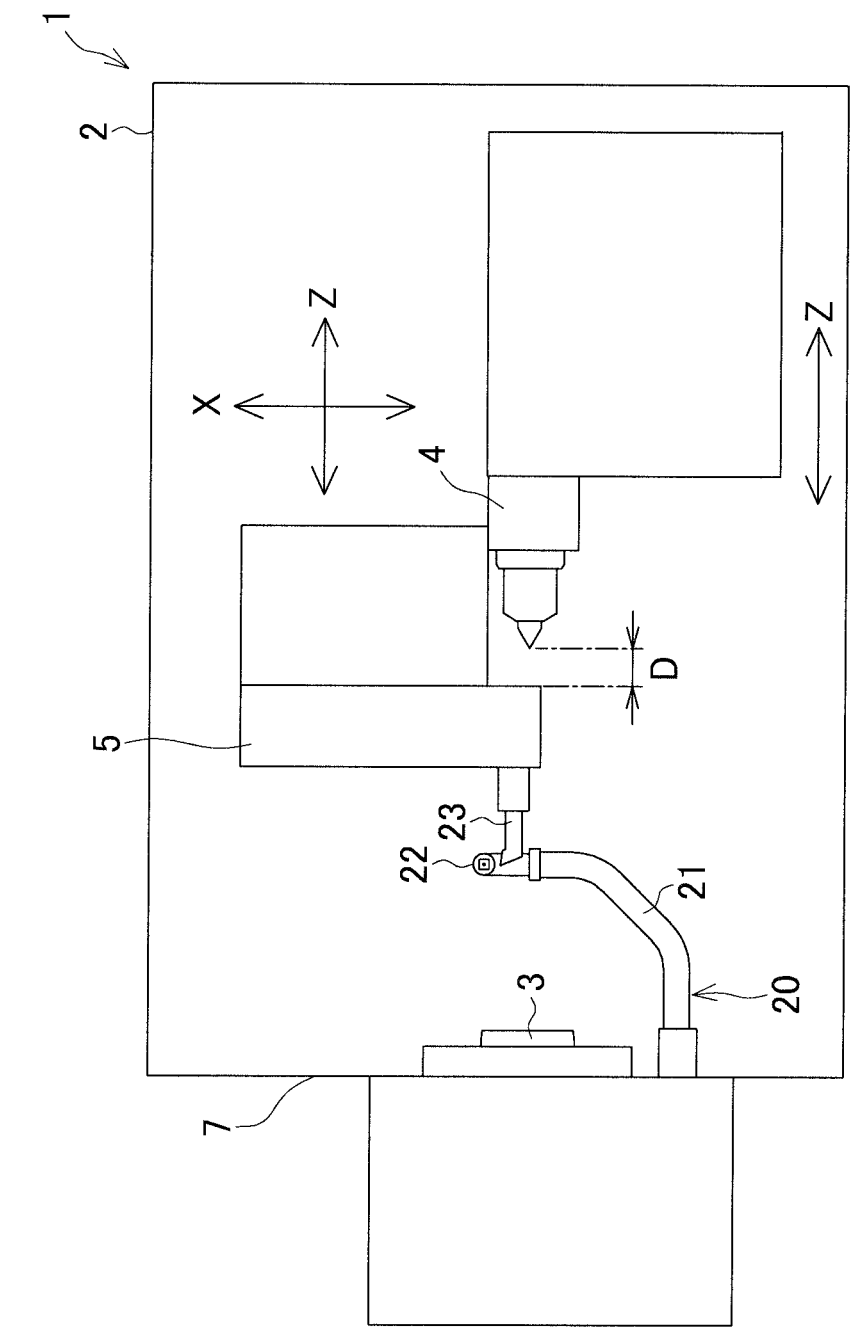
FIG. 4 is a schematic diagram of a tool cutting edge measuring device according to a related art that measures an inner diameter tool and the horizontal lathe.

FIG. 1 is a schematic diagram illustrating an example of a horizontal lathe. First, a horizontal lathe 1 includes a spindle 3, a tailstock 4, and a tool post 5 in a machining chamber 2 surrounded by a wall. The spindle 3 including a chuck is configured to rotate, the tailstock 4 is opposed to the spindle 3 and movable in a Z-axis direction, and the tool post 5 is movable in an X-axis direction and the Z-axis direction, which has a configuration similar to FIG. 4. A driving mechanism unit 6 of the spindle 3 that houses, for example, a motor is disposed outside the machining chamber 2, and a tool cutting edge measuring device 10 is disposed on a wall 7 at the spindle side.

Figure 2:
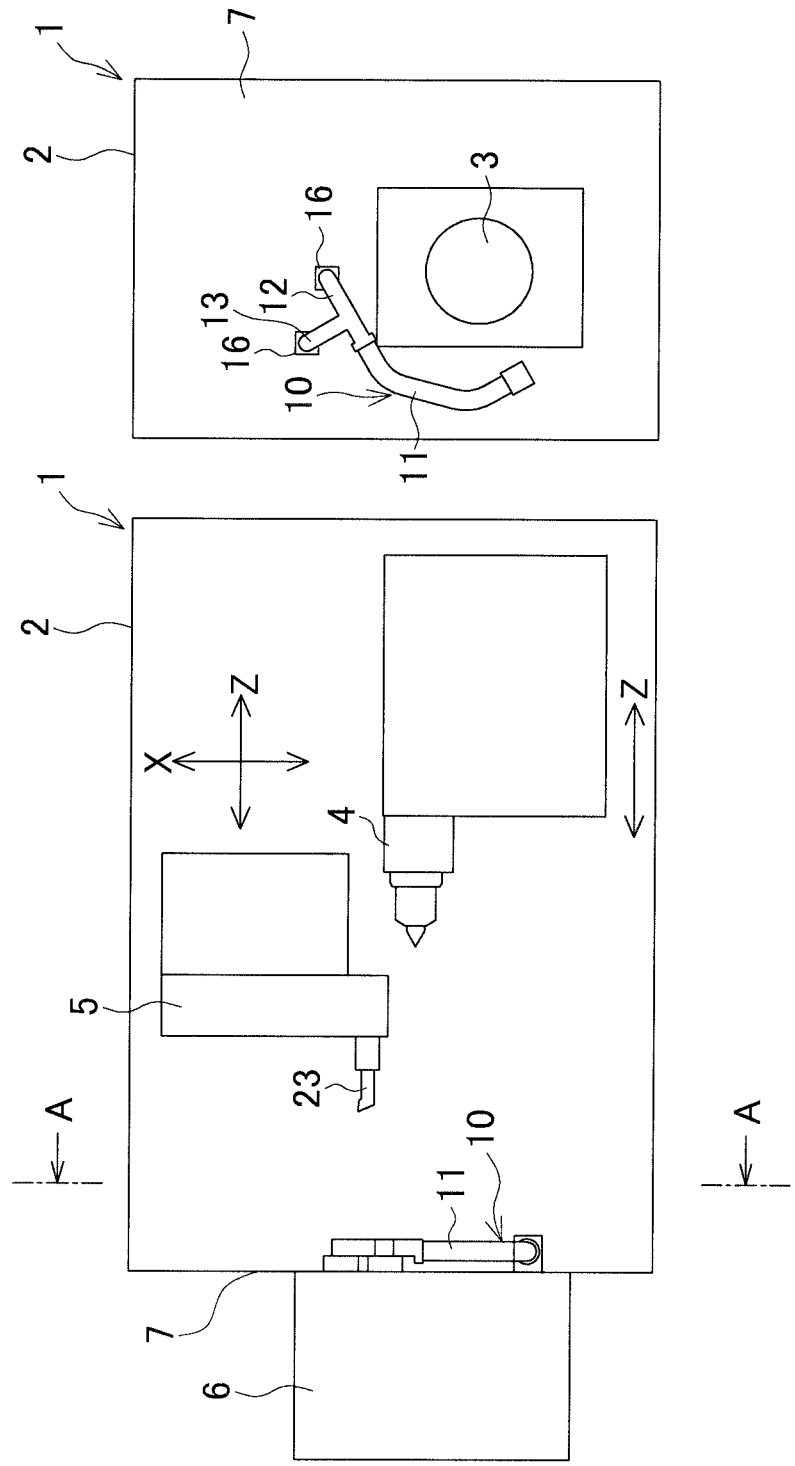
FIG. 2A illustrates explanatory diagrams illustrating an arm at a retracted position and a schematic diagram from a font.
FIG. 2B illustrates explanatory diagrams illustrating an arm at a retracted position and a cross-sectioned surface taken along the line A-A.

The tool cutting edge measuring device 10 is provided with, for example, the motor and gears inside the driving mechanism unit 6 and includes an arm 11 that turns up and down inside the machining chamber 2. The arm 11 can turn up and down between an advance position where the arm 11 advances to the inside of the machining chamber 2 as illustrated in FIG. 1 and a retracted position where the arm 11 stands up to be approximately perpendicular upward along the wall 7 as illustrated in FIG. 2 by control by the driving mechanism unit 6.

The arm 11 at the advance position has a shape in which the arm 11 extends in the Z-axis positive direction and then curves in the X-axis positive direction. A first branching unit 12 that extends in the X-axis positive direction at the advance position and a second branching unit 13 that is orthogonal to the first branching unit 12 and extends in the Z-axis positive direction at the advance position are disposed on distal ends of the arm 11.

Among them, a first touch sensor 14 for measuring an inner diameter tool is disposed at the distal end of the first branching unit 12. The first touch sensor 14 is disposed at a position not overlapping with the tailstock 4 in the Z-axis direction. A second touch sensor 15 for measuring an outer diameter tool is disposed at the distal end of the second branching unit 13. On the wall 7, housing portions 16, 16 (FIG. 2) are disposed such that the first and second touch sensors 14, 15 are inserted and housed at the retracted position of the arm 11 to avoid exposure of the first and second touch sensors 14, 15 to the inside of the machining chamber 2.

When a cutting edge of an inner diameter tool 23 disposed on the tool post 5 is measured by the tool cutting edge measuring device 10 configured as described above, first, the arm 11 is advanced to the advance position. Then, as illustrated in FIG. 1, the tool post 5 is moved to a standby position where the cutting edge of the inner diameter tool 23 is on the X-axis negative side with respect to the first touch sensor 14. After that, the tool post 5 is moved to the X-axis positive direction to cause the cutting edge to abut on a detection surface on the X-axis negative side of the first touch sensor 14. Then, the first touch sensor 14 outputs a detection signal, and an NC device (not illustrated) calculates a tool correction value based on positional data of a machine origin at the time and positional data when a reference tool has been preliminarily brought into abutment so that a machining program is corrected.

At the time, the first touch sensor 14 is disposed on the first branching unit 12 that projects in the X-axis positive direction, and the tailstock 4 is not positioned on an extension of the first touch sensor 14 in the Z-axis positive direction. Therefore, when the inner diameter tool 23 abuts on the first touch sensor 14, a distance D between the tool post 5 and the tailstock 4 in the Z-axis direction increases. Accordingly, even when the length of the inner diameter tool 23 is long, the cutting edge of the inner diameter tool 23 can be brought into abutment with the first touch sensor 14 without an interference with the tailstock 4.

Figure 3:
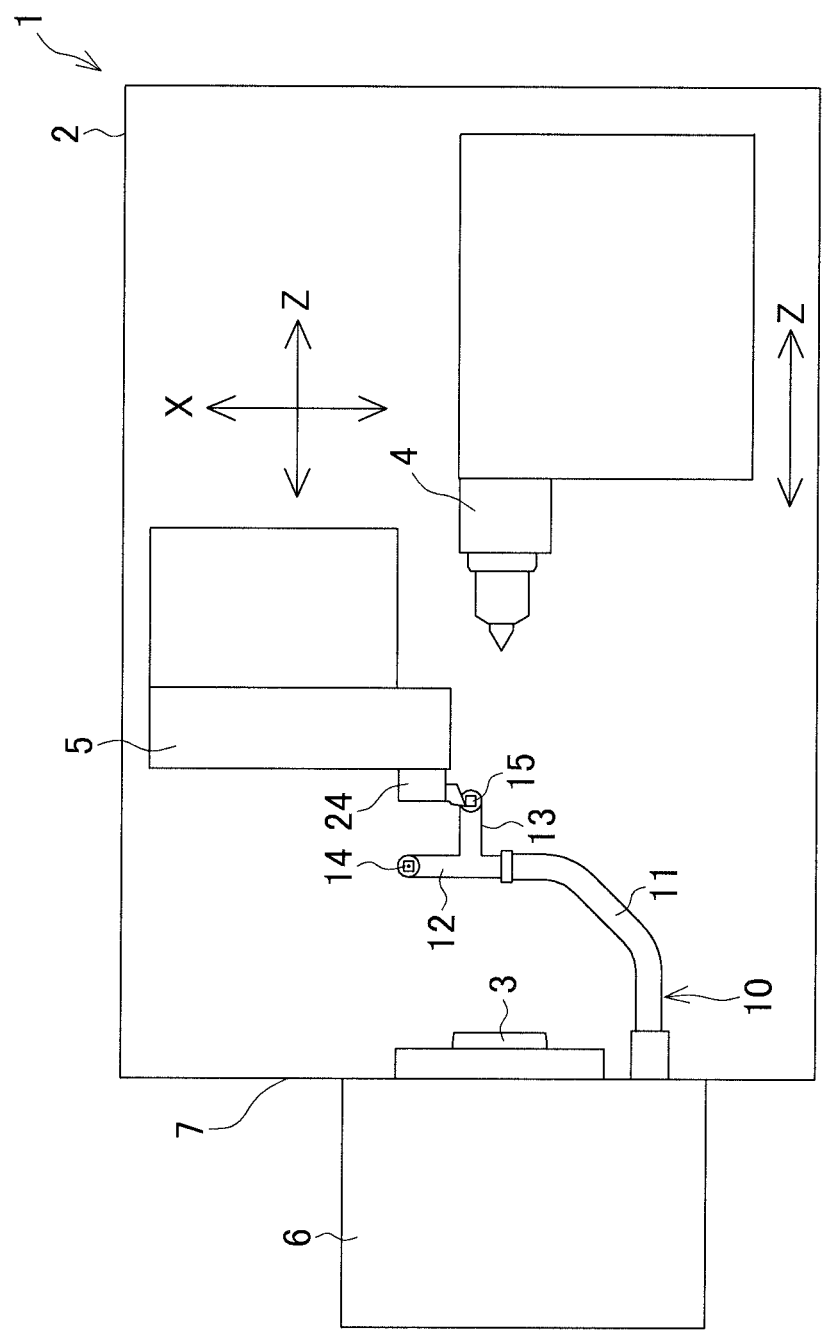
FIG. 3 is a schematic diagram of the tool cutting edge measuring device that measures an outer diameter tool and the horizontal lathe.

Meanwhile, to detect a cutting edge of an outer diameter tool 24, the tool post 5 is moved with the arm 11 at the advance position to a standby position where the cutting edge of the outer diameter tool 24 is on the X-axis positive side with respect to the second touch sensor 15 as illustrated in FIG. 3. The tool post 5 is moved to the X-axis negative direction to cause the cutting edge to abut on a detection surface on the X-axis positive side of the second touch sensor 15. Then, the second touch sensor 15 outputs a detection signal, and the NC device calculates a tool correction value based on positional data of a machine origin at the time and positional data when the reference tool has been preliminarily brought into abutment so that the machining program is corrected.

When the correction of the machining program is thus ended, the tool post 5 moves to a start position of machining and the arm 11 retracts to the retracted position for machining.

According to the tool cutting edge measuring device 10 and the horizontal lathe 1 with the above described configurations, the arm 11 movable between the advance position and the retracted position is provided and the arm 11 advances into the machining chamber 2 at the advance position. The arm 11 retracts from the machining chamber 2 at the retracted position. The arm 11 has the distal ends provided with the two first and second branching units 12, 13 branched into the X-axis direction and the Z-axis direction at the advance position. The first and second sensors 14, 15 (contact type sensors) are mounted to the respective first and second branching units 12, 13. Therefore, the one first touch sensor 14 can advance into the machining chamber 2, and even with the tool having a long protrusion, the tool can be easily brought into abutment with the first touch sensor 14 without an interference with a structure, such as the tailstock 4, and without a restriction on a stroke. As a result, the cutting edge can be measured while the interference with the structure inside the machine can be avoided regardless of a type of the tool, and the required tool length can be ensured.

While the horizontal lathe including one tool post is exemplified in the above described configuration, a two-saddle horizontal lathe also allows measuring cutting edges of tools each mounted to an upper tool post and a lower tool post.

While the first touch sensor is used for inner diameter tool and the second touch sensor is used for outer diameter tool in the above described configuration, the sensors may be switched as long as not interfering with the structure. Any touch sensor may be used for measurement of the inner diameter tool and measurement of the outer diameter tool. Accordingly, the detection surfaces may be provided on a plurality of surfaces of the touch sensor. A length of the branching unit is also changeable.

Furthermore, the arm is not limited to the turning type as in the above described configuration. For example, a guide mechanism that causes the arm to linearly move from the wall in the Z-axis direction may be disposed to cause the arm to appear and to disappear between the advance position and the retracted position.

Besides, the tool cutting edge measuring device may be installed on another wall of the machining chamber. Obviously, the disclosure is also applicable to any machine tool including, for example, a vertical lathe and a multitasking machine, in addition to the horizontal lathe.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A tool cutting edge measuring device mounted to a machine tool, the machine tool being capable of relatively positioning a tool post in a Z-axis direction as a spindle axial direction and an X-axis direction as a moving direction for cutting a workpiece in a radial direction, the X-axis direction being orthogonal to the Z-axis direction, the tool cutting edge measuring device comprising:
   contact type sensors configured to measure cutting edge positions of tools in a machining chamber; and
   an arm movable between an advance position and a retracted position, the arm advancing into the machining chamber at the advance position, the arm retracting from the machining chamber at the retracted position, wherein
   the arm has distal ends provided with two branching units branched into the X-axis direction and the Z-axis direction at the advance position, and the sensors, each of which measures a different object, are independently mounted to the respective branching units.

2. The tool cutting edge measuring device according to claim 1, wherein one of the sensors is configured to measure an inner diameter machining tool of the workpiece, and another sensor is configured to measure an outer diameter machining tool of the workpiece.

3. A machine tool capable of relatively positioning a tool post in a Z-axis direction as a spindle axial direction and an X-axis direction as a moving direction for cutting a workpiece in a radial direction, the X-axis direction being orthogonal to the Z-axis direction, the machine tool comprising the tool cutting edge measuring device according to claim 2.

4. A machine tool capable of relatively positioning a tool post in a Z-axis direction as a spindle axial direction and an X-axis direction as a moving direction for cutting a workpiece in a radial direction, the X-axis direction being orthogonal to the Z-axis direction, the machine tool comprising the tool cutting edge measuring device according to claim 1.

* * * * *